United States Patent [19]

Huvey

[11] Patent Number: 4,904,176

[45] Date of Patent: Feb. 27, 1990

[54] DEVICE FOR CONTINUOUSLY PRODUCING REINFORCED STABILIZABLE PROFILED BODIES BY A MANDREL AND A SUPPORT

[75] Inventor: Michel Huvey, Bougival, France

[73] Assignee: Institut Francais due Petrole, Rueil Malmaison, France

[21] Appl. No.: 206,841

[22] Filed: Jun. 15, 1988

[30] Foreign Application Priority Data

Jun. 15, 1987 [FR] France ............................. 87 08329

[51] Int. Cl.[4] .......................................... B29C 53/62
[52] U.S. Cl. ..................................... 425/391; 425/90; 425/320; 425/502; 425/505
[58] Field of Search ............................... 425/391–393, 425/320, 322, 500, 505, 502, 503, 451.2, 90, 107; 264/166, 103; 156/244.13

[56] References Cited

U.S. PATENT DOCUMENTS

| | | | |
|---|---|---|---|
| 2,501,288 | 3/1950 | Nilsson | 425/322 X |
| 3,387,348 | 6/1968 | Kilgallon | 425/391 X |
| 3,497,413 | 2/1970 | Ullman et al. | 425/391 X |
| 3,572,023 | 3/1971 | Galonska | 425/391 X |
| 3,943,224 | 3/1976 | Drostholm | 156/244.13 X |
| 3,966,388 | 6/1976 | Banavent et al. | 425/451.2 X |
| 4,074,958 | 2/1978 | Molenaar | 425/391 X |

FOREIGN PATENT DOCUMENTS

| | | |
|---|---|---|
| 2049167 | 3/1971 | France . |
| 2312356 | 12/1976 | France . |
| 2494401 | 5/1982 | France . |
| 2088320 | 6/1982 | United Kingdom . |

Primary Examiner—Richard L. Chiesa
Attorney, Agent, or Firm—Antonelli, Terry & Wands

[57] ABSTRACT

A device for continuously producing reinforced stabilizable profiled section bodies, with the device including a mandrel and a drive for rotationally driving the mandrel around the longitudinal axis thereof. The mandrel maintains at least one support of a profile section helically wound on the mandrel. A reinforcement impregnated with stabilizable material is wound around the mandrel and the at least one support. A stabilization arrangement is disposed on at least one portion of a length of the mandrel, and the reinforced material, having undergone stabilization, is separated from the mandrel. The support is wound onto a first extremity of the mandrel and separated from the mandrel at a second extremity. The first extremity of the mandrel includes a first elevated zone or calibration bearing surface on which the support is to be wound, with the bearing surface having a sufficient length to drive the support, through a capstan effect, while not impeding a progression of the support on the mandrel.

24 Claims, 2 Drawing Sheets

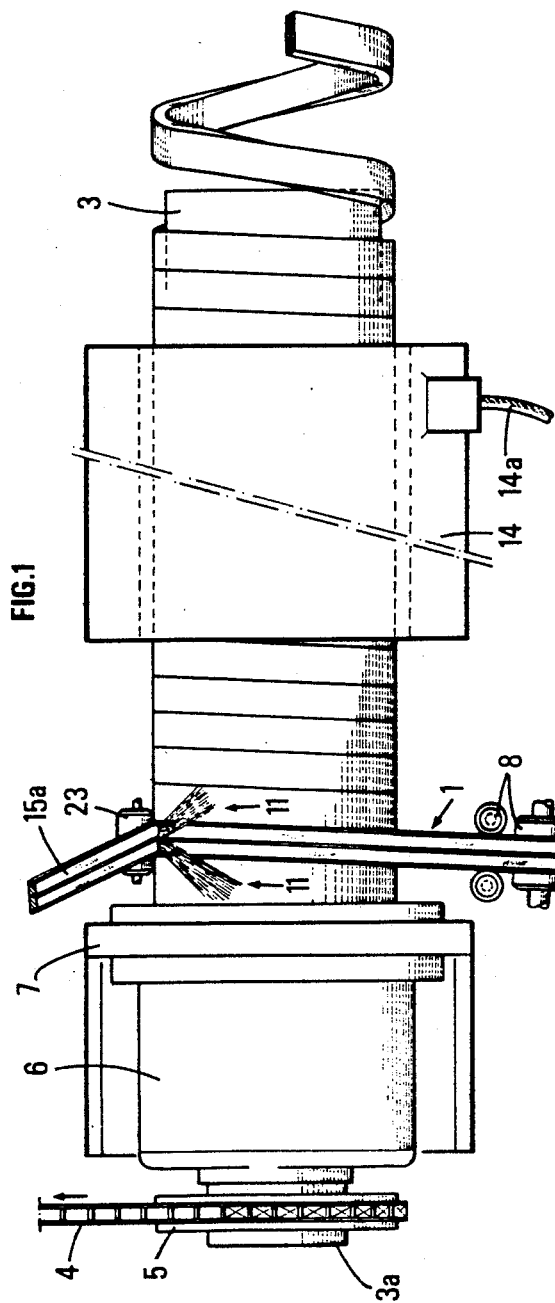
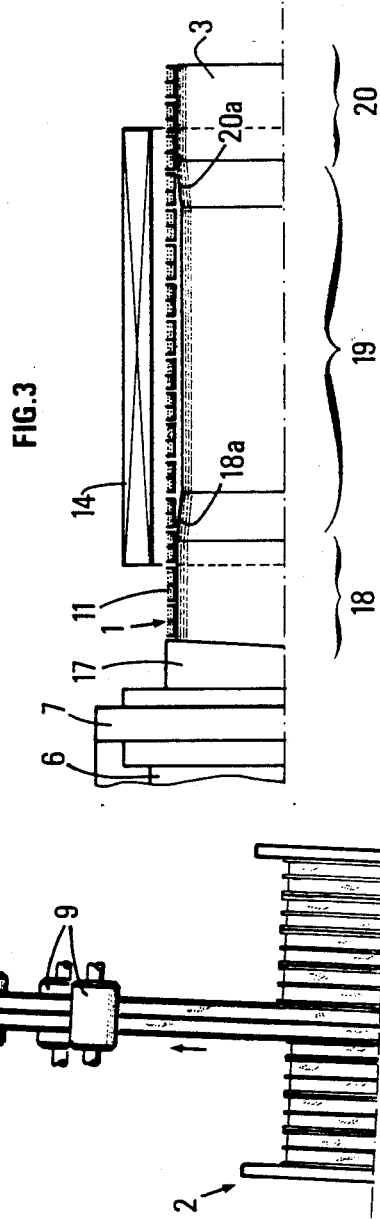

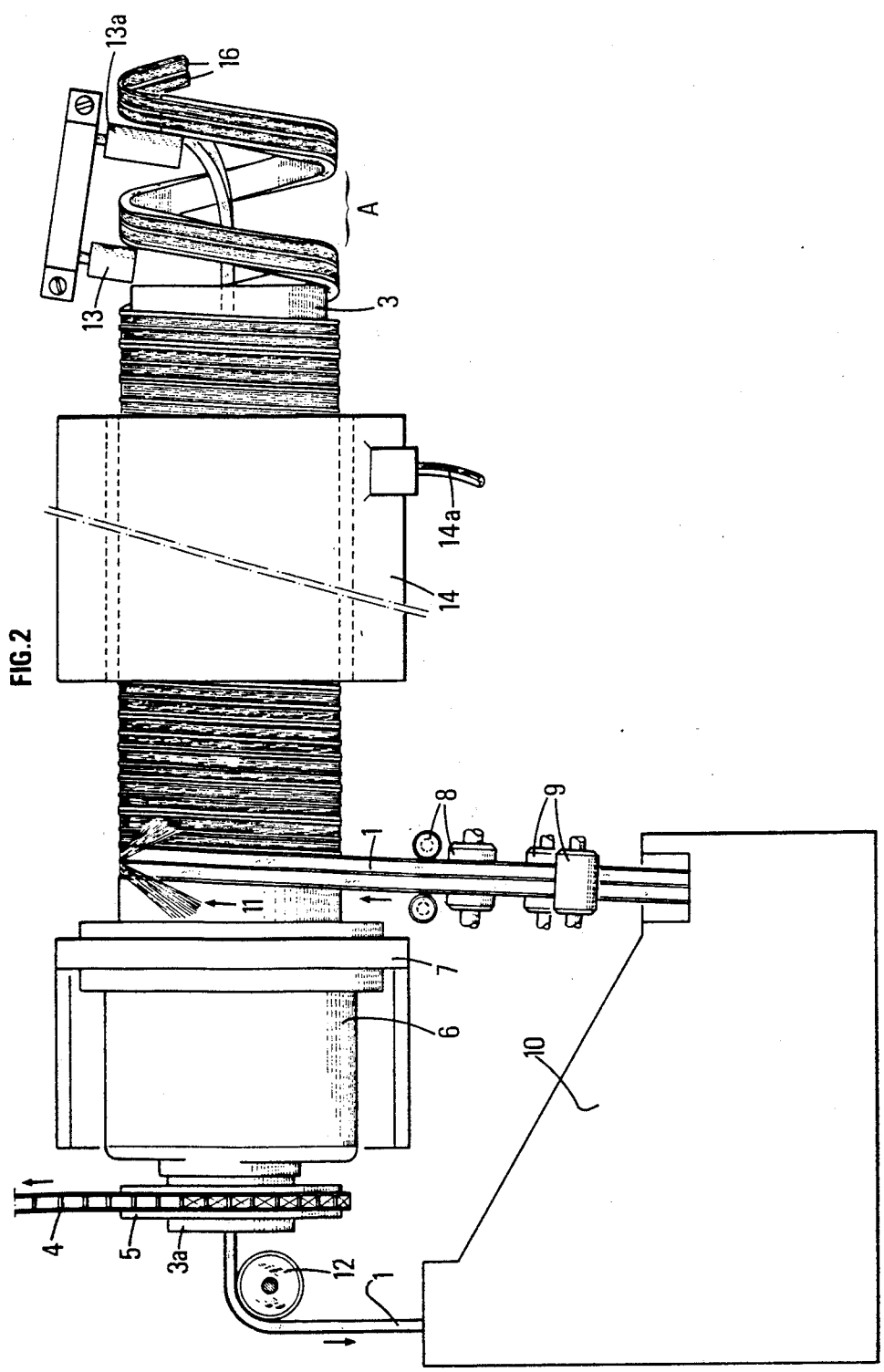

DEVICE FOR CONTINUOUSLY PRODUCING REINFORCED STABILIZABLE PROFILED BODIES BY A MANDREL AND A SUPPORT

BACKGROUND OF THE INVENTION

The present invention relates to a production apparatus and, more particularly, to a continuous production device for bodies having a reinforced stabilizable profile section.

Production device of the aforementioned type are disclosed in, for example, British application No. A-2088320 and French No. A-2312356 wherein a mandrel is rotatably driven around a longitudinal axis with a helically wound support being wound onto the mandrel. The profiled section bodies may, in particular, be inward curved bars made of reinforced stabilizable material.

Such bars can be used to shape rigid or flexible shafts, such as tubes, resistant to pressure differential, traction, compression, torsion or bending stresses.

The term "stabilizable material" means that the bodies can assume a stable form via a physical or chemical process, such as melting with cooling or cross linkage. These materials may, for example, be thermoplastic materials, thermosetting materials, elastomers or metals.

Some prior techniques for producing profiled bars by using a mandrel or hollow section are, for example, described in U.S. Pat. No. 3.966.388 and FR-A-2.312.356, or in the French patent application EN. 86/05.093 which concerns a support simultaneously moulding several bars.

However, industrial application of these prior techniques has shown that there is a lack of flexibility of the production device due to an irregularity of the forward movement of the mould support on the mandrel and increased adverse effect when the production rate and/or the length of the mandrel is increased.

The length of the mandrel depends in particular on the stabilization of the material constituting the bars. Generally, this length increases relatively as much as the rotation speed of the mandrel, itself an increasing function of the production rate.

The use of long stabilization ovens authorizes the use of slow stabilization material, such as not very reactive resins, and thus allows for many advantages to be gained from this material, such as pre-reticulation.

This irregularity of forward movement is accompanied by blockages of the support and/or the section when the support is wound onto the mandrel, or when it moves forward, or even when it is evacuated.

These blockages can lead to deformations of sections and, more particularly, in curved bars which produce disastrous stresses when used, especially when finally installed, for the production of tubes.

In accordance with advantageous features of the present invention, a device for continuously producing reinforced stabilizable profiled section bodies is provided which includes a mandrel and means for driving the mandrel and means for rotationally driving the mandrel around a longitudinal axis thereof, with the mandrel supporting at least one helically wound support thereon. Means are provided for causing the support to move in a forward direction longitudinally on the mandrel, such as a slope, and means wind around the mandrel and onto the support of the reinforcement elements impregnated with stabilizable material. A stabilization means is disposed on at least one part of a length of the mandrel, and means are provided to separate the reinforced material having undergone stabilization from the mandrel. The support is wound onto a first extremity of the mandrel and separated from the mandrel at a second extremity.

This device in particular is characterized in that the first extremity of the mandrel includes an elevated first zone, known as a calibration bearing surface, on which the support is wound, with the bearing surface being long enough to drive the support via a capstan, effect and being limited in length so as to not impede the forward movement of the support on the mandrel.

Thus, by means of this calibration bearing surface, which may have a constant diameter, the longitudinal frictions of the support, on the part comprising a diameter restriction and called standard length of the mandrel, are considerably reduced. Because of this, the length of the mandrel may be quite large without risking blockages and overlaps of the support occurring on the mandrel, especially as regards its standard length. Similarly, the circumferential drive of the section via the capstan effect is much better controlled and the longitudinal drive, produced by the insertion of the support between the ramp of the mandrel and the final thread of the introduced support, is much more stable.

The second extremity of the mandrel could include a second elevated zone, known as an extraction bearing surface, on which the support is wound and from which the support unwinds. This extraction bearing surface has a suitable length and diameter adapted to allow for proper forward movement of the support on the mandrel when a disengaging traction is exerted on the support at the mandrel extremity.

The extraction boaring surface enables the extraction speed to be adjusted by roughly making it equal the feed speed. This arrangement prevents the accumulation of bars wich produces bars loops in the oven or prevents tractions on these bars, namely, detrimental residual stresses or malformation of bars during the use of bars and also blockages when forward driving of the support on the mandrel.

The extraction bearing surface is especially useful when the bars once extracted are routed to an automatic station, such as an automatic winding station.

The mandrel could comprise, at least on one part of the calibration bearing surface and possibly extraction bearing surface, an antiadhesive material adapted to prevent adherence because of possible projections of the stabilized material from the support onto the mandrel.

This invention also proposes the use of a system for lubricating a mandrel for profiled body production, in particular a mandrel as the one offered by the invention, which notably increases the flexiblity of the use of devices employing such mandrels.

The device could comprise a suitable lubrication system to favor a longitudinal displacement of the support on the mandrel in the direction of the second extremity. This system could include a suitable lubricating fluid, at least as regards the contact between the support and the mandrel. This system could also include, at least on one part of the calibration and possibly extraction bearing surfaces, a material favoring sliding of the support on the mandrel. This material could be TEFLON, which is a registered trademark of Du Pont de Nemours.

Similarly, this invention proposes, especially for calibration and possibly extraction bearing mandrels as previously described, that at least one part of the extraction and/or calibration surface includes a coating suitable for selectively favoring circumferential friction, preferably without too adversely affecting the longitudinal friction of the support on the mandrel. In this way, the support shall be correctly rotationally driven and could move on large lengths without encountering the previously mentioned drawbacks.

When the profiled section bodies are inwardly curved profiled section bars, the support can comprise at least one groove forming a mould with a section roughly corresponding that of the bar to be obtained.

This invention also offers a process to continuously produce inwardly curved bars with a profiled section by a device comprising a combination of a mandrel, means driving this mandrel in rotation around its longitudinal axis, with the mandrel supporting at least one hollow section wound helically onto the mandrel, and the section comprising at least one groove forming a section corresponding to that of the section or profile to be obtained. Means wind around the mandrel and in the groove reinforcement elements impregnated with a stabilizable material, and reticulation means are disposed on at least one part of the length of the mandrel, with means separating the profiled reinforced material which has undergone stabilization from the mold.

In accordance with the process of the present invention, the hollow profile or section is wound onto a first extremity of the mandrel comprising a calibration surface by creating a capstan effect between the mandrel and the hollow profile and/or reinforcement element, and the hollow profile, lined with the reinforcement elements, moves longitudinally to a second extremity above one part of the mandrel having a diameter less than that of the calibration bearing surfaces, with the hollow profile then being separated from the mandrel at the second extremity.

In French patent application No. A-2049167, a production of fixed glass fiber bars embedded in thermosetting resin, with the bars having the shape of a helix, with the aid of a shaper cylinder as proposed wherein a profiled groove and a drive drum turning in the direction of the pitch of the helix are provided, with the drive drum driving the bars while they are hardening.

BRIEF DESCRIPTION OF THE DRAWINGS

The present invention will be better understood and the advantages thereof shall be clearer from a reading of the following description when taken in connection with the accompanying drawings which show, for the purposes of illustration only, two embodiments in accordance with the present invention, and wherein:

FIGS. 1 and 2 are schematic views of an operating production device for curved bars constructed in accordance with the present invention; and FIG. 3 is a partial longitudinal view of another embodiment of a production device for curved bars constructed in accordance with the present invention.

DETAILED DESCRIPTION

As shown in FIGS. 1 and 2, a hollowed profile support generally designated by the reference numeral 1 is coiled onto a drum or mandrel 3, with a shaft of spindle 3a of the drum 3 being connected to a rotational drive means comprising, for example, a chain 4 gearing on a toothed gear 5 fastened to the shaft of spindle 3a. The shaft or spindle 3a rests on a bearing 6 by roller bearings, with the bearing 6 being integral with the frame 7. Prior to being coiled on the mandrel 3, the profiled support passes between the guiding rollers 8 and tension rollers 9.

The profiled support 1 comprises several longitudinal grooves which, as they gradually unwind on the drum 3, are filled with filaments 11 with a high resistance, or rovings, firstly impregnated with a stabilizable plastic material, possibly able to adhere to the internal walls of the grooves according to their position in the support and the purpose intended and capable of adhering to the filaments the mixture of filaments and of stabilizable material form the cores 16 of the profiled support which, after extraction, shall become the reinforced curved bars.

The support 1, also known as the support mould or even the profiled mould, once lined, then enters an oven 14 where it is subjected to heat treatment to stabilize the reinforced plastic material it contains.

The oven 14 is supplied with energy by any suitable means, such as, for example, the cable 14a, if electrical heating means are used.

As shown in FIG. 1, a storing coil 2 is provided for the profiled mould which, passing between the guiding rollers 8 and tension rollers 9, is filled with the said filaments.

Prior to entering the oven 14, the mold may possibly be covered with an element 15, 15a forming a cover. The covering element could be a plastic strip 15 or even a profiled element 15a whose section is adapted to allow for its fitting onto the mould 1 before the heat treatment in the oven 14 as described in for example French Pat. No. 2.494,401 or the French patent application EN. 86/05.096.

A roller 23 presses the element 15a onto the profiled mould 1 to provide this fitting. Slight traction on the element 15a may also provide this fitting via a capstan effect.

As illustrated in FIG. 2, it is also possible to extract from the profiled mould 1 the profiled inwardly curved bars 16 which are shaped by moulding. For example, this extraction is effected at a point situated at the mandrel outlet by bending the profiled mould 1 by rollers 13 and 13a towards the axis of the mandrel and by making the profiled mold 1 pass into the mandrel 3, then in the shaft or spindle 3a towards the left of FIG. 2 the mandrel 3 and the shaft or spindle both having been bored.

It is also possible to directly pull out the profiled mold 1 between sets of shaped bars, for example, into the space A in FIG. 2.

The reinforced inwardly curved bars 16 extracted from the profiled mould 1 are directed towards a storage or use location. As for the profiled mould 1 which passes onto the roller 12 at the outlet of the drive shaft or spindle 3a, the profiled mold 1 may be stored or reused continuously after passing into a device 10 for cleaning the mould 1 by suitable means.

By way of example in no way restrictive, a hollow support is made having grooves throats forming three identical moulds with a rectangular section 5 mm×7 mm and external walls and internal partitions being 1 mm thick. This support could be made of a material such as Polyamide 11 generally designated as RILSAN, a registered trademark, by a conventional extrusion process.

The grooves has been lined with a mixture of 70 parts by weight of continuous pack of unidirectional glass fibers, not twisted, and 30 parts by weight of a mixture of epoxide resin of bisphenol A diglycidylether (100 parts) and 4.4' diaminodiphenylmethane (27 parts by weight).

Once the lining has been executed, a suitable counter-form, as described in the French patent FR-2.312.356, may be used to ensure proper distribution of the lining in the mould.

After spending a time in the oven 14, the finished product leaves the mandrel 3 and the spiral obtained can be used as a reinforcement element to produce a light resistant pipe.

FIG. 3 shows in detail an arrangement of the mandrel 3 which allows for a correct displacement of the various spires of the profiled mold 1.

The capstan effect required to drive the support in rotation with the mandrel is produced by sufficient traction of the profiled mould 1 and/or of the rovings 11.

The friction of the rovings coils initially stored on a creel may, for example, constantly provide this traction.

The introduction of the profiled mould 1 at a first extremity of the mandrel 3 against the ramp 17 produces a translation displacement onto the mandrel 3 of all the spires of the support towards the second extremity of the mandrel 3.

The profiled mould 1 is calibrated in a first elevated or heightened zone 18 of the mandrel 3, known as the calibration bearing surface whose length may, for example, be between 10 and 40 spire widths of the profiled mould 1 or preferably 20 spire widths when the mandrel is coated with TEFLON.

On this calibration bearing surface, the armouring wires are placed inside the support.

In an intermediate zone 19 corresponding to the standard length of the mandrel 3, a diameter restriction is practiced so that the profiled mould 1 is routed towards the second extremity of the mandrel with a minimum of friction between the profiled mold 1 and the mandrel 3.

In practice, this diameter restriction, which is between 0.5 and 2 mm for a mandrel 3 with a diameter of 75 cm (namely, a relative restriction roughly between 7/1000 and 3/100) is somewhat larger than that which one would have been able to calculate so as to take account of dimensional variations of the profiled mold 1, especially due to shrinkage resulting from stabilization, more particularly in the oven 14.

This restriction of diameters between that of the calibration bearing surface 18 and that of the intermediate zone must not be too large so as to avoid producing overlapping of spires or create blockages in the oven and thus completely destroy the effect desired.

Given the fact that a gradual filling of the profiled mold 1 on several spires (about ten) together with the rovings 11 is carried out on the calibration bearing surface 18, one can consider as a first approximation that the length of the intermediate zone 19 is close to the length of the oven 14 itself dependent on sufficient and optimum stabilization time for a certain temperature and a given material.

Thus, for example, when the rotational speed of the mandrel 3 is 1 revolution per minute and when one is looking for a stabilization time of one hour, the number of spires in the oven is 60. For a rotation speed of 2 revolutions per minute and the same stabilization time, the number of spires in the oven is 120. Similarly, for a rotation speed of 3 revolutions per minute and with the same stabilization conditions, the number of spires in the oven is 180.

In a second elevated zone 20 of the mandrel 3, known as the extraction bearing surface, with a length adapted to the forces required to extract the mould from the mandrel via a capstan effect, the support mould is placed on the mandrel propelled by the forward movement of the spires.

The movement of the spires between the intermediate zone 19 and the extraction bearing surface 20 is effected by a small value taper 20a.

Similarly, the passage of the spires from the calibration bearing surface 18 to the intermediate zone could be effected by means of a taper 18a.

The diameter of the extraction bearing surface 20 is adapted, especially depending on the support dimensional variations due to stabilization, so as to avoid producing any disorganization in the spires and so that the support and/or bars mass flow rate is roughly constant between the calibration bearing surface 18 and the extraction bearing surface 20.

To favor sliding into the calibration bearing surface 18 and/or extraction bearing surface 20, it is essential that the mandrel 3 is slidable and remains there throughout the operation, which may last for months, round the clock for large productions. In order to do this, it is essential that the resin droplets overflowing from the profiled mould 1 and coming into contact with the hot mandrel 3 do not adhere to it. This is possible by using a hard TEFLON coating 30 to 150 micrometers thick. To improve sliding even further, the friction surface between the profiled mould 1 and mandrel 3 is continually lubricated by continuously depositing a film of oil on the bottom of the profiled mould on an appropriate station slightly upstream of the installation point of the profile mould 1 on the mandrel 3. When the profile mould 1 has to form an integral part of the profile, the laying of this oil film is carried so that this film can never penetrate the profiled mould 1, which prevents any adherence of the composite to the profiled mould 1. The oil used shall preferably be non-aggressive for RIL-SAN and will not radically decompose at the oven walls' temperature.;

On the other hand, it is clear that as regards cases of producing profiles for which the profiled mould 1 is not an essential element, the film of oil could be laid inside, just as outside, and could thus constitute a mould removal agent allowing for the easy recycling of the profile mould 1.

I claim:

1. Device for continuously producing profiled section bodies of a reinforced stabilizable material, the device comprising a mandrel means, means for rotationally driving said mandrel means around a longitudinal axis thereof, at least one profiled sectional support means wound helically onto said mandrel means, means for moving to make said at least one profiled sectional support means longitudinally on said mandrel means, means for winding reinforcement elements impregnated with stabilizable material around the mandrel means and onto said at least one profiled sectional support means means disposed along at least one part of a length of the mandrel means for stabilizing the stabilizable material, means for separating the reinforced material having undergone stabilization from the mandrel means, said at least one profiled sectional support means being wound at a first extremity of the mandrel means and separated from the mandrel means at a second extremity thereof, and wherein a first elevated zone is provided at the first extremity of said mandrel means upon which said at least one profiled sectional support means is wound, said first zone having a length sufficient to enable a driving of the at least one profiled support means through a capstan effect relative to the mandrel means without impeding a forward movement of the at least one profiled sectional support means on said mandrel means.

2. Device according to claim 1, wherein the first elevated zone has a substantially constant diameter.

3. Device according to one of claims 1 or 2, wherein the second extremity of said mandrel means comprises a second elevated zone on which said at least one profiled sectional support means is wound and from which said at least one profiled sectional support means is unwound, and wherein said second elevated zone has a length and diameter to allow for a proper progression of said at least one profiled sectional support means on said mandrel means when a disengaging traction is exerted on said at least one profiled sectional support means at the second extremity of said mandrel means.

4. Device according to claim 3, wherein at least on one part of the first zone includes an anti-adhesive material for preventing adherence due to a possible projection of the stabilized material from said at least one profiled sectional support means onto said mandrel means.

5. Device according to claim 3, wherein a lubrication means is provided for enhancing a longitudinal displacement of said at least one profiled sectional support means on said mandrel means in a direction of said second extremity.

6. Device according to claim 5, wherein said lubrication means comprises means for supplying a lubricating fluid at least at a contact area between said at least one profiled sectional support means and said mandrel means.

7. Device according to claim 6, wherein said lubrication means comprises, on at least one part of the first zone a material favoring a sliding of said at least one profiled sectional support means on said mandrel means.

8. Device according to claim 7, wherein at least one part of the first zone comprises a coating means for selectively favoring circumferential friction without excessively affecting longitudinal friction of the at least one profiled sectional support means on said mandrel means.

9. Device according to claim 8, wherein the profiled section bodies are profiled section inwardly curved bars, and wherein said at least one profiled sectional support means comprises at least one groove means for forming a mold with a section substantially corresponding to a section of the inwardly curved bar to be obtained.

10. Device according to claim 3, wherein said second elevated zone includes an extracting bearing surface means.

11. Device according to claim 10, wherein at least one part of the extracting bearing surface means has an anti-adhesive material for preventing adherence due to a possible projection of the stabilized material from said at least one profiled sectional support means onto said mandrel means.

12. Device according to claim 11, wherein a lubrication means is provided for enhancing a longitudinal displacement of the at least one profiled sectional support means on said mandrel means in a direction of said second extremity.

13. Device according to claim 12, wherein said lubrication means comprises means for supplying a lubricating fluid at least at a contact area between said at least one profiled sectional support means and said mandrel means.

14. Device according to claim 13, wherein said lubrication means comprises, on at least one part of said extracting bearing surface means a material favoring a sliding of said at least one profiled sectional support means on said mandrel means.

15. Device according to claim 14, wherein at least one part of the extracting bearing surface means comprises a coating means for selectively favoring circumferential friction without excessively affecting longitudinal friction of the at least one profiled sectional support means on said mandrel means.

16. Device according to claim 10, wherein the first elevated zone includes a calibration bearing surface means.

17. Device according to claim 16, wherein at least one part of the calibration bearing surface means and at least one part of the extraction bearing surface means includes an anti-adhesive material for preventing adherence due to a possible projection of the stabilized material from said at least one profiled sectional support means onto said mandrel means.

18. Device according to claim 17, wherein a lubrication means is provided for enhancing a longitudinal displacement of said at least one profiled sectional support means on said mandrel means in a direction of said second extremity.

19. Device according to claim 18, wherein said lubrication means comprises means for supplying lubricating fluid at least at a contact area between said at least one profiled sectional support means and said mandrel means.

20. Device according to claim 19, wherein said lubrication means comprises, at least on one part of said calibration bearing surface means and said extraction bearing surface means, a material favoring a sliding of the at least one profiled sectional support means on said mandrel means.

21. Device according to claim 20, wherein at least one part of the calibration bearing surface means and said extraction bearing surface means comprises a coating means selectively favoring circumferential friction without excessively affecting longitudinal friction of the at least one profiled sectional support means on said mandrel means.

22. Device according to one of claims 1 or 2, wherein the first elevated zone includes a calibration bearing surface means.

23. Device according to one of claims 1 or 2, wherein the profiled section bodies are profiled section inwardly curved bars, and wherein said at least one profiled sectional support means comprises at least one groove means for forming a mold with a section substantially corresponding to a section of the inwardly curved bar to be obtained.

24. Device according to one of claims 1 or 2, wherein said means for moving said at least one profiled support means longitudinally on said mandrel means includes a ramp means.

* * * * *